(12) United States Patent
Brown

(10) Patent No.: US 6,259,461 B1
(45) Date of Patent: *Jul. 10, 2001

(54) SYSTEM AND METHOD FOR ACCELERATING THE RENDERING OF GRAPHICS IN A MULTI-PASS RENDERING ENVIRONMENT

(75) Inventor: John M. Brown, Fort Collins, CO (US)

(73) Assignee: Hewlett Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,564

(22) Filed: Oct. 14, 1998

(51) Int. Cl.$^7$ ........................................ G09G 5/36
(52) U.S. Cl. ................................ 345/556; 345/506
(58) Field of Search ...................... 345/501, 506–509, 345/514, 503, 520, 530, 556, 545

(56) References Cited

U.S. PATENT DOCUMENTS

| | | | |
|---|---|---|---|
| 5,416,893 | 5/1995 | Herrel et al. | 395/122 |
| 5,561,752 | * 10/1996 | Jevans | 345/33 |
| 5,729,671 | * 3/1998 | Peterson et al. | 345/423 |
| 5,914,726 | * 6/1999 | Schultz | 345/501 |
| 5,971,583 | * 10/1999 | Ohnishi et al. | 364/468.04 |
| 6,118,452 | * 9/2000 | Gannett | 345/418 |

\* cited by examiner

*Primary Examiner*—Kee M. Tung

(57) ABSTRACT

The present invention is directed to a method and apparatus for accelerating the performance of a multi-pass rendering operation. The method operates in a computer graphics system having an application program that interfaces through an application program interface (API) to a graphics pipeline, including a rendering pipeline and a frame buffer. The method includes the step of providing a visibility flag that is in communication with the application program to relay rendering information to the application program. The method clears the visibility flag upon sending new data to the rendering pipeline, and sets the visibility flag if data sent to the rendering pipeline from the application program is further communicated to the frame buffer for display. Thereafter, the method evaluates the visibility flag from within the application program after a first pass of a first segment of graphics data has been rendered by the rendering pipeline. If the visibility flag was not set during the first pass, then the application program inhibits the rendering of subsequent passes of the first segment of graphics data. If, however, the visibility flag was set during the first pass, then the application program will send subsequent passes of the graphics data to the rendering pipeline for processing and display.

19 Claims, 7 Drawing Sheets

SYSTEM AND METHOD FOR ACCELERATING THE RENDERING OF GRAPHICS IN A MULTI-PASS RENDERING ENVIRONMENT

FIELD OF THE INVENTION

The present invention relates to computer graphics systems and, more particularly, to a computer graphics system that accelerates the rendering of graphics in a multi-pass rendering environment.

DISCUSSION OF THE RELATED ART

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components (at the API—application program interface—level) of a graphics display and usually are simple structures such as points, lines, vectors and polygons (e.g., triangles and quadrilaterals). Typically, a hardware/software scheme is implemented to render, or draw, the graphics primitives that represent a view of one or more objects being represented on the display screen.

As is known, traditional computer graphic displays rendered wire frame images of objects, since wire frame images possess a relatively small amount of data to process. However, with ever increasing processing capabilities and operating speeds of computer graphic systems, such systems now frequently render shaded images of the surface of objects. In this fashion, smooth shading provides increased realism and the ability to visualize more complex models. However, in such displays, some of the image information may be lost. Accordingly, and to benefit from the best of both methods, graphics applications often combine wire frame (or edging) and shaded primitives in the same image, by first rendering the shaded surface, and then rendering the edges of the shaded surface to represent the wire frame. In this regard, a wire frame can overlay a shaded surface to provide structural information, such as the original data point that generated the model. When a model is constructed using splines, the wire frame can show spline patch boundaries, or the control points used to calculate the spline surface. Another benefit of wire frame modeling is selective highlighting of a subset of a model, such as a subassembly with a complex mechanical part.

For example, consider a CAD (computer aided design) station where a designer is designing or modeling a mechanical part for some engineering design application. The mechanical part, which may be rather complex, may be displayed on a computer graphics station using shading of the object surface. If, however, there is a particular portion of the object that the designer is particularly interested in, a user interface may be provided to allow the designer to select (e.g., using a mouse) a portion of the graphic image, and the system may respond by displaying further information (e.g., edging information) for that selected portion.

Applications use a variety of methods to simultaneously display wire frame and shaded objects. Some graphics libraries provide polygon edging support directly, which means a polygon can be rendered with a solid fill and an edge in a distinct color with a single call to the library. If no such library support exists, the application must make two separate graphics calls: a first call to display a filled polygon, followed by a second call to display the polygon edges. Some applications prefer to display edge vectors after rendering all polygons, to progressively highlight different features of a model.

As is known, one shortcoming in displaying both shaded information and edging information relates to the processing time required to format and display the image. In this regard, such displays usually require multiple passes, wherein a first pass is made that renders the surface shading information, and a second pass is made to render object edging information. Conventionally, for a given object or segment of graphic data that is to be displayed, an application program provides all the shading information to a rendering pipeline, which performs various graphic computations required for the display. In a second pass, the application program provides the rendering pipeline with edging information, which is then formulated within the rendering pipeline for display.

One shortcoming known to exist in prior art systems relates to the computations required in the rendering pipeline for information that ultimately does not get displayed on the display screen to the user. Returning to the previous example, suppose a CAD designer is modeling a mechanical device that has many internal parts self-contained within an outer shell. If the graphic display is displaying a pictorial representation of the exterior of the object, the internal component objects will not be visible to the developer. Therefore, the graphic system need not process this information for display.

In conventional graphic systems, a well known mechanism, commonly called a z-buffer, is used in graphic display systems. As is known, the z-buffer maintains depth information for objects in a graphic display. For example, as a graphic system is processing and displaying a number of objects that collectively make up a graphic scene, each object may comprise a number of primitives, which in turn comprise a number of display pixels. The z-buffer maintains depth information for each display pixel on the graphic display. As any object is rendered for display, a number of pixels are to be illuminated in a certain defined manner in order to display the object. A depth value is associated for each point on an object that corresponds to a pixel on the display. This depth information is maintained in a z-buffer, for the shallowest (nearest) point depths. For example, for a given pixel on a display screen, when a first object is to be rendered in a graphic image, there may be no initial value in the z-buffer. Therefore, that pixel may be illuminated in accordance with the graphics rendering hardware. When another object is to be displayed that has a point that corresponds to the given pixel, the depth of that point is compared with the stored depth in the z-buffer. If the later rendered point has a depth value that indicates it is closer to the viewer (screen) than the previously rendered object, then that point is rendered and its depth value recorded in the z-buffer. Otherwise, the point is not rendered and its value is not recorded in the z-buffer. As will be appreciated by those skilled in the art, the foregoing example is simplified in that it ignores certain contingencies, such as the rendering of transparent object surfaces.

For purposes of the invention that will be described hereinafter, a shortcoming with prior art systems is that a significant amount of processing time is often expended and lost processing graphic images (or portions thereof) that ultimately will not be rendered on a graphics display. Accordingly, there is a desire to improve the performance of graphic systems by eliminating processing associated with objects or other portions of graphic images that will not be displayed because they may be hidden by other objects on the display or otherwise.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a computer graphics system and method that has increased performance and throughput. Broadly, the increased throughput is achieved by a novel system and method that eliminates unnecessary processing of graphic data for objects that will ultimately not be viewable by a user on the display. The invention achieves these advantages in a multi-pass graphics rendering system, wherein certain graphic data (e.g., fill data) is rendered in a first-pass. Then, additional graphic data (e.g. edging data) is rendered in subsequent passes, only if the primitive, object, or graphic segment rendered was determined, during the first pass, to be visible. If the primitive, object, or graphic segment was determined not to be visible (e.g., off screen or occluded), then the data need not be processed in a rendering pipeline.

In accordance with one aspect of the invention, a method is provided for accelerating the performance of a multi-pass rendering operation. The method operates in a computer graphics system having an application program that interfaces through an application program interface (API) to a graphics pipeline, including a rendering pipeline and a frame buffer. The method includes the step of providing a visibility flag that is in communication with the application program to relay rendering information to the application program. The method clears (or resets) the visibility flag upon sending new data to the rendering pipeline, and sets the visibility flag if data sent to the rendering pipeline from the application program is further communicated to the frame buffer for display. Thereafter, the method evaluates the visibility flag from within the application program after a first pass of a first segment of graphics data has been rendered by the rendering pipeline. If the visibility flag was not set during the first pass, then the application program inhibits the rendering of subsequent passes of the first segment of graphics data. If, however, the visibility flag was set during the first pass, then the application program will send subsequent passes of the graphics data to the rendering pipeline for processing and display.

In accordance with another aspect of the present invention, an apparatus is provided for accelerating the rendering of computer graphics. The apparatus includes an application program defining at least one graphic segment to be displayed, and a graphics rendering pipeline (preferably implemented in hardware) in communication with the application program. The graphics rendering pipeline is configured to receive segments of graphics data from the application program and perform the mathematical computations necessary for rendering the data for display. The apparatus further includes a visibility flag configured to indicate whether any of the graphics data within a segment of graphics data sent from the application program to the rendering pipeline is visible to a user viewing the display. Finally, a circuit is configured to clear the visibility flag when a segment of graphics data is sent from the application program to the rendering pipeline, the circuit being further configured to set the visibility flag if any of the graphics data in the segment is sent to the frame buffer for display.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the invention above, reference will now be made in detail to the description of the invention as illustrated by the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
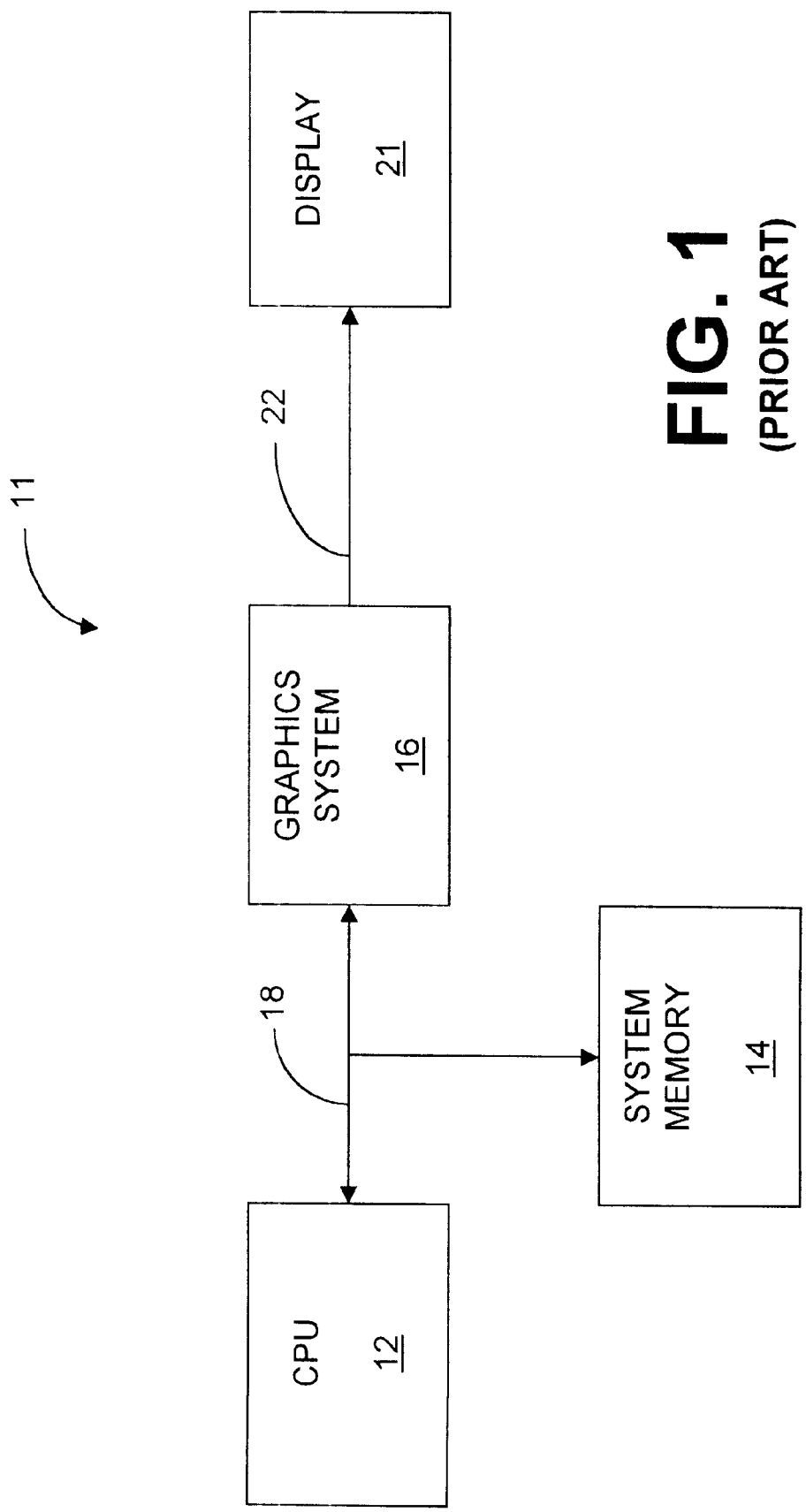
FIG. 1 illustrates a block diagram of a computer graphics system in accordance with the prior art.
Figure 2:
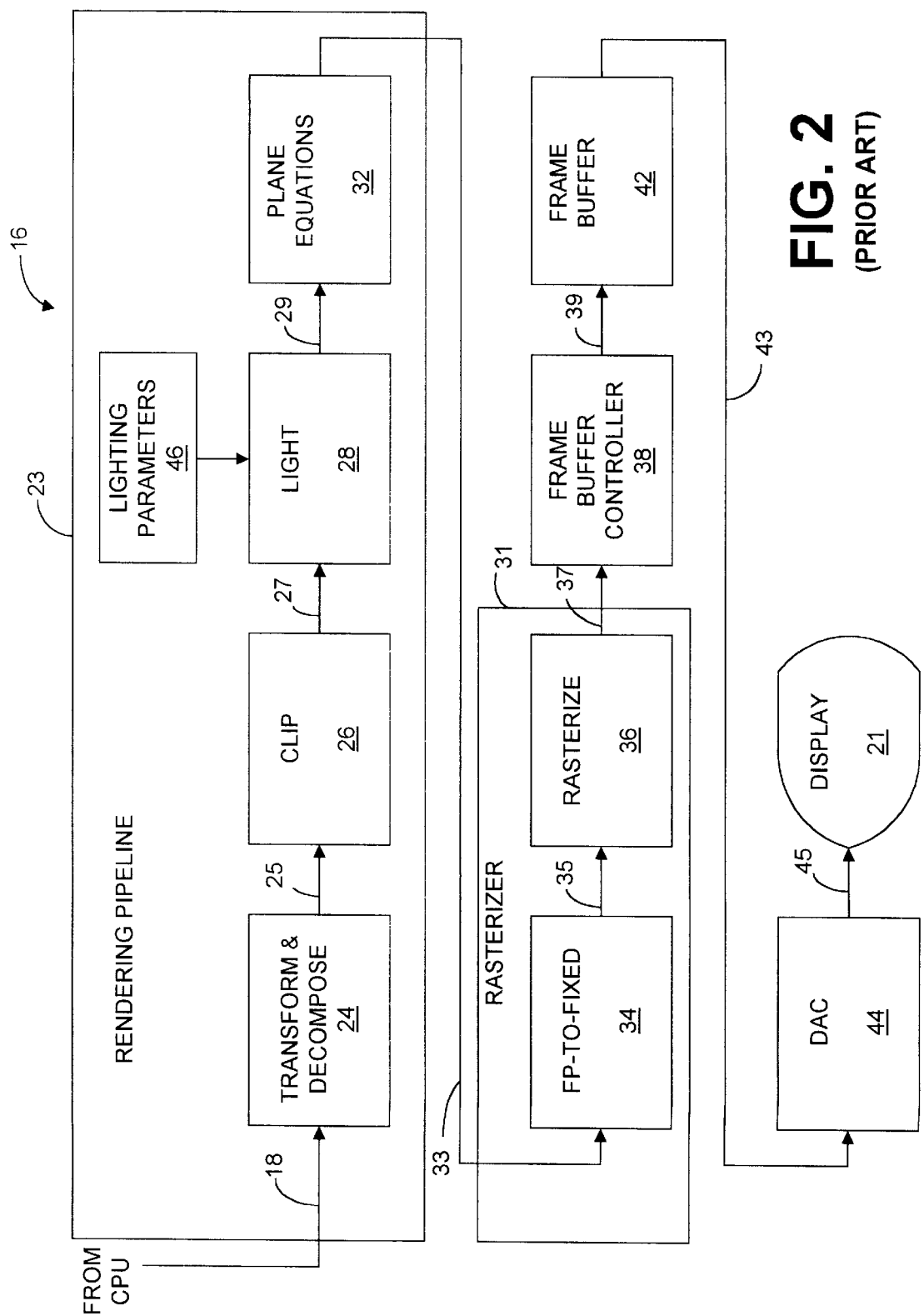
FIG. 2 is a block diagram of a computer graphics system showing more detail than that shown in FIG. 1.

Before turning to the description of the presently preferred embodiment, some fundamental components of a computer graphics pipeline are first discussed. In this regard, the basic components of a conventional computer graphics display system are shown in FIGS. 1 and 2. The computer graphics display system 16 comprises a rendering pipeline 23, a rasterizer 31, a frame buffer controller 38, and a frame buffer 42. The computer graphics display system 16 may also include texture mapping hardware (not shown). The rendering pipeline 23 receives vertex data from the host CPU 12 that defines the primitives that make up the image to be displayed on the display 21.

The rendering pipeline 23 may include a transform component 24, which receives vertex data from the CPU 12, a clipping component 26, an illumination or lighting component 28, and a plane equations component 32. The transform and decomposition component 24 performs transformations on the primitive vertex data received from the CPU 12, such as rotation and translation of the image space defined by vertex data. It also performs primitive decomposition, which decomposes multi-sided polygons into triangle (preferably)

primitives, as triangle primitives are generally easier to work with than multi-sided polygons. It will be appreciated that, although the transform and decomposition block has been illustrated herein as a single functional block, the transform and decomposition functions may in fact be handled separately.

The clipping component 26 clips the vertex data so that only vertex data relating to primitives that make up the portion of the view that will be seen by the user is kept for further processing. If the vertex data reveals that the entire primitive is outside the viewing window, then all other vertex data may be discarded or ignored. Otherwise, and as is known in the art, new vertices are created at a clip boundary. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The illumination component 28, hereinafter referred to as a lighting machine, calculates the final colors of the vertices of the primitives based on the both vertex data and on the locations of the light source(s) and the viewer relative to the object being displayed. This information is introduced to the lighting machine 28 through lighting parameters 46. While the lighting parameters element 46 is illustrated as a separate block, it will be appreciated that this block is preferably implemented by a section of memory dedicated to storing the various lighting parameters. The system CPU 12, through software, ultimately conveys the data for these parameters to the rendering pipeline 23 and its memory.

The plane equations component 32 generates floating point equations which define the image space within the vertices on the display screen. That is, the plane equations component 32 specifies how to illuminate pixels between the vertices. The floating point equations are converted into fixed point equations by floating point to fixed point component 34 before being rasterized. The rasterizing component 36 of rasterizer 31 and the texture mapping hardware (not shown) generate the final screen coordinates and color data for each pixel in each primitive. The pixel data is stored in a frame buffer 42 for display on a video display screen 21.

It will be appreciated by persons skilled in the art that the graphics system described in FIGS. 1 and 2 is simply one example of a graphics systems, and various systems and implementations may be made to such a system consistent with the concepts of the present invention. In this regard, the purpose of the foregoing discussion is simply to depict the relative complexity involved in contemporary graphics systems, and to illustrate the relatively intense computations that are performed in rendering graphics to a display. The present invention serves to eliminate the relatively intense processing of many of these computations for objects that, ultimately, will not be displayed.

Figure 3:
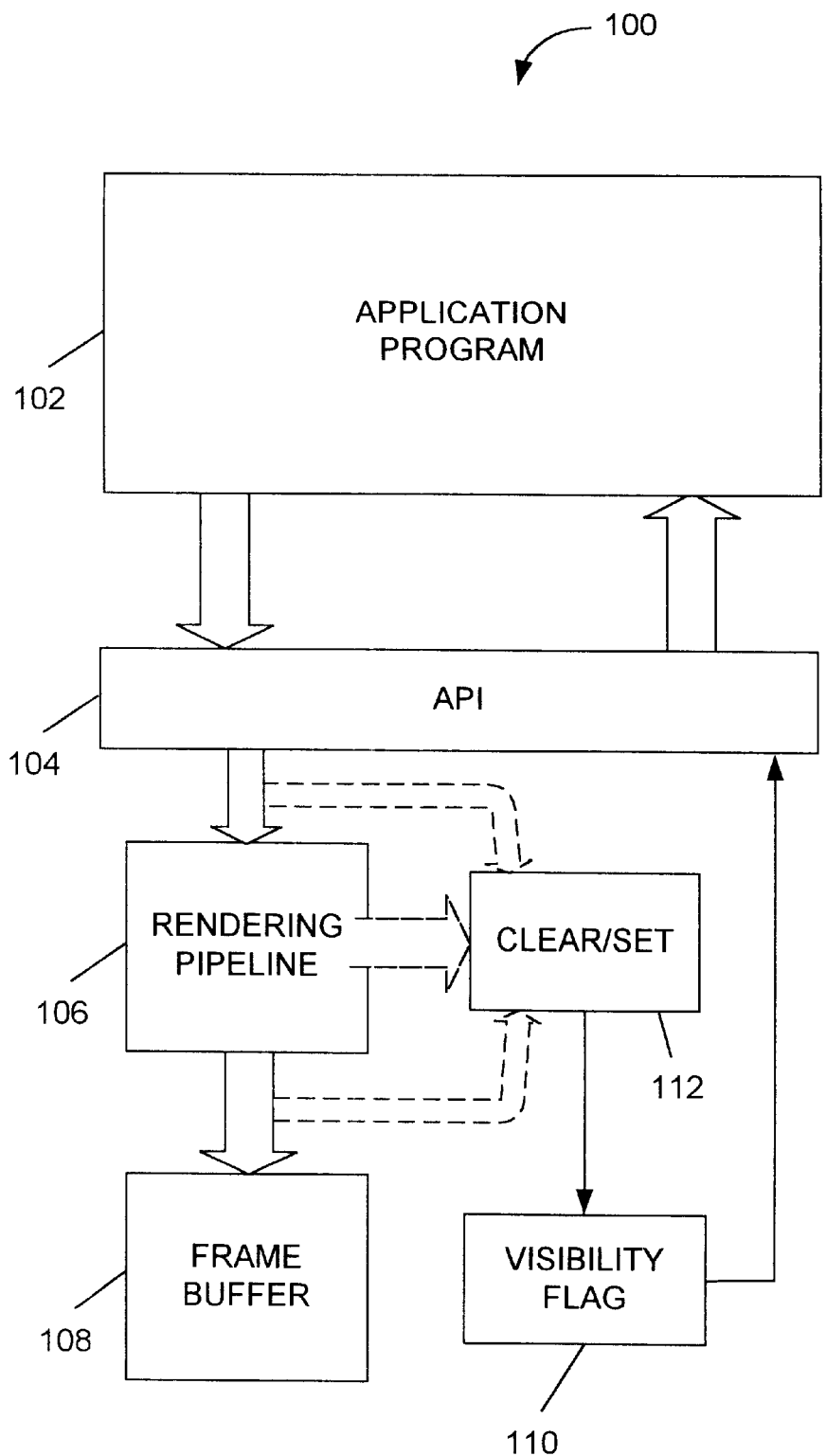
FIG. 3 is a block diagram of a computer graphics system constructed in accordance with the invention.

Therefore, having set forth this general discussion, reference is made to FIG. 3, which illustrates the primary components of a graphic system constructed in accordance with the present invention, and generally designated by reference numeral 100. The graphics system 100 comprises an application program 102, which generates a graphic image to be displayed on a display. An API 104 is in communication with the application program 102, and serves as an interface to the graphics hardware. Consistent with the concepts and teachings of the present invention, the API 104 may be any of a variety of APIs, such as OpenGL. Downstream of the API 104, preferably implemented in hardware, is a rendering pipeline 106. As illustrated above, the rendering pipeline 106 performs a variety of computations on the graphic data communicated from the application program 102, in order to prepare that data for presentation on a display. Preferably, these functions and computations are performed in hardware to provide the maximum speed and throughput in a graphic system. However, consistent with the concepts and teachings of the present invention, these functions may be performed in software as well. As related to the present invention, one of the computations or functions performed in the rendering pipeline 106 includes the rendering of object surface information (e.g., for primitive fill operations), edging computations, etc. A frame buffer 108 is disposed downstream of the rendering pipeline, and operates to display the data that is prepared by the rendering pipeline 106.

As is known, and previously described, graphic data that is determined not to be visible to a user (because it is outside the window/screen area, because it is occluded by another object, or otherwise) is not sent from the rendering pipeline 106 to the frame buffer 108. Unfortunately, in systems of the prior art, much of the processing performed in the rendering pipeline 106 was performed before identifying whether the data was visible to a viewer or not. Accordingly, a large number of computations are performed, which ultimately serve no useful purpose (since the data is not displayed).

The present invention is directed to a novel apparatus and method for reducing the number of such unused computations, and thereby enhancing the throughput and performance of a graphics system. In this regard, the present invention utilizes a visibility flag 110, along with an associated mechanism 112 for controlling the status of the flag (i.e., clearing and setting the flag). In accordance with the preferred embodiment, the visibility flag is cleared as a segment of graphic data is sent to the rendering pipeline 106 for processing. If it is determined that any of the graphic data within the segment of data sent to the rendering pipeline 106 is displayed (i.e., communicated on to the frame buffer 108), then the mechanism 112 sets the visibility flag 110. Utilizing this visibility flag 110, various benefits and advantages can be controllably obtained in the development of computer graphics application software.

Consistent with the concepts and teachings of the invention, the visibility flag may be set or cleared by calls or commands made from the application program 102, and thus under the control of an application program developer. Alternatively, the mechanism 112 may be implemented to automatically set and clear the status of the visibility flag 110. In one implementation, the mechanism 112 may sense the initial transfer of graphics data from the API 104 to the rendering pipeline 106, and the mechanism may respond by clearing the status of the visibility flag. Thereafter, the mechanism 112 may sense or detect the communication of data from the rendering pipeline 106 to the frame buffer for display, and the mechanism 112 may respond by setting the status of the visibility flag. Alternatively, the mechanism 112 may be controlled directly from the rendering pipeline 106 itself, to set and clear the status of the visibility flag.

In accordance with one aspect of the invention, processing time may be significantly reduced when performing multi-pass operations. For example, and as previously mentioned, many APIs, such as OpenGL, do not support compound graphics calls which, for example, render a primitive in both filled and edged forms. Thus, an application program 102 may be configured with a graphics call that specifies a primitive to be filled. A separate, subsequent graphics call may then be made to define the same primitive (or object) for edging. In accordance with the present invention, when the application program 102 performs a graphics call that specifies a primitive to be filled on a "first pass", it may thereafter check the visibility flag 110 to see if, in fact, any portion of that primitive was sent to the frame buffer 108 for display. If the status of the visibility flag 110 indicates that no part of the primitive was displayed, then the application program 102 may skip any subsequent graphics calls for that primitive (e.g., calls to perform edging or other graphics functions). In this way, valuable time may be saved that would otherwise be expended performing unnecessary rendering and other graphics computations, in the rendering pipeline 106.

In similar fashion, when an application program 102 is configured to display a graphics scene that requires the rendering of relatively complex (i.e., computationally extensive) graphics shapes or objects, the application program 102 may be segmented by a developer to first send a relatively simplified version of the object or shape to be rendered to the graphics pipeline, and thereafter test the visibility of flag 110. If the visibility flag indicates that no part of the shape was rendered, then the application program 102 may skip over subsequent graphics calls that would further render the shape or object. In this way, otherwise unnecessary computations may be saved by selective and carefull programming at the application program 102 level.

Figure 4:
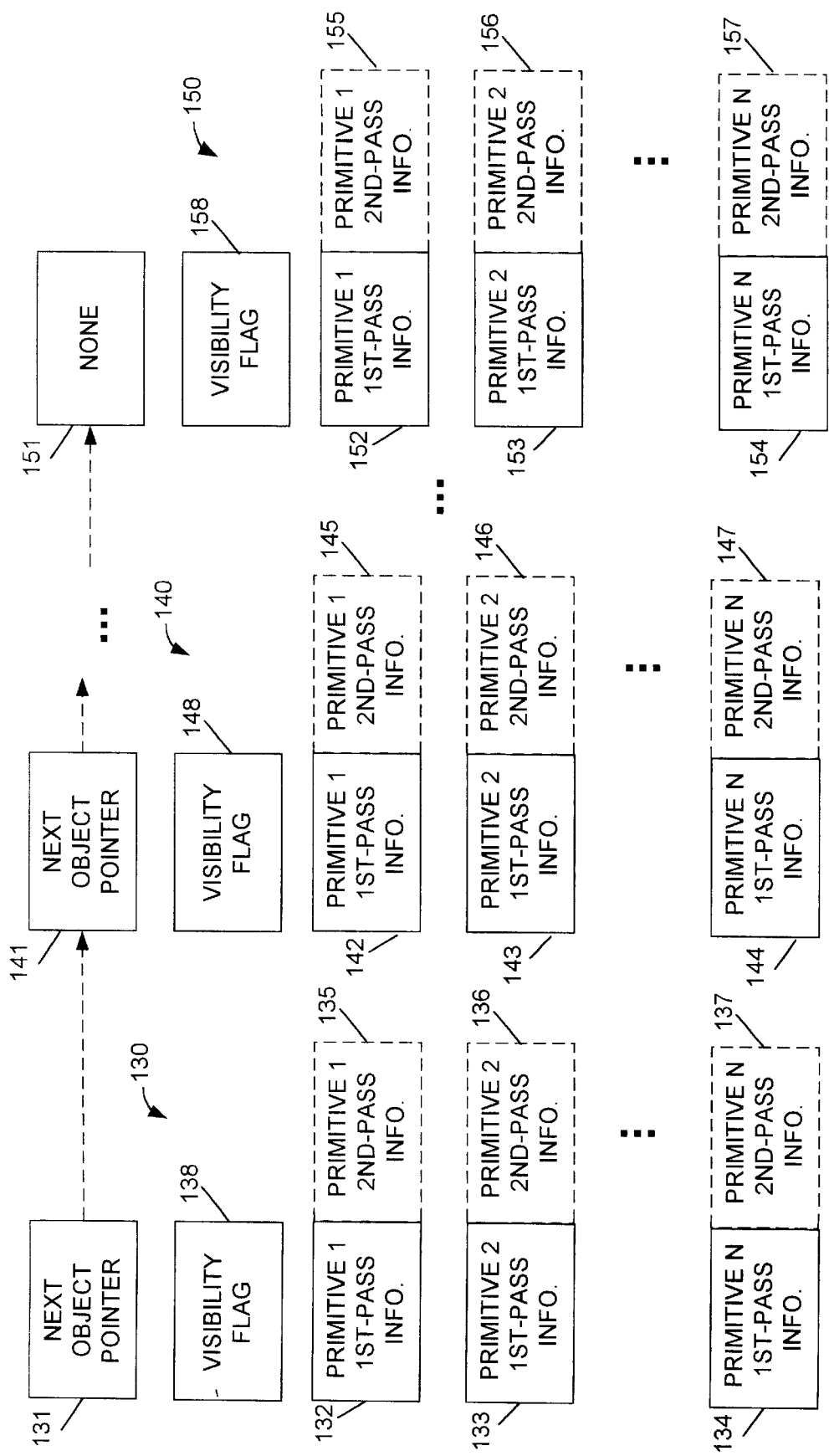
FIG. 4 is a diagram illustrating a data structure of a graphic object in accordance with one embodiment of the invention.

Having illustrated the fundamental concepts of the present invention above, reference will now be made to various figures that illustrate the operation of the present invention in various preferred embodiments. In this regard, reference is made to FIG. 4, which shows a block diagram illustrating a related set of data structures 130, 140, 150, which may be utilized by a software developer for representing a graphic image that is to be displayed on a display. In this regard, a programmer may elect to display a scene or a graphic image as a collection of distinct objects. The overall scene may be rendered, therefore, by rendering each object successively. In this regard, each object may include a pointer 131, 141, 151 that points to the next object that is to be rendered in a given graphics scene. As will be appreciated, the objects are structures that are defined by the programmer/developer and therefore are not limiting upon the concepts of the present invention.

As relatively simplistically illustrated in the drawing, each object structure may define a plurality of primitives that collectively define the object. For example, the object structure 130 includes primitives 132, 133, and 134. These primitives 132, 133, and 134 may define areas to be filled with a given color, shading, texture, etc. Additional primitives 135, 136, and 137 may also be provided and associated with primitives 132, 133, and 134. In this regard, a given object may have different primitives for filled versus edged renderings, or may have the same primitives and render the primitives with different attributes. In the latter case, the primitives 132, 133, and 134 may define a first set of attributes, while primitives 135, 136, and 137 may define a second set of attributes. Similar characteristics would be present in the other data structures 140 and 150 as well.

In addition, and in accordance with the teachings of the present invention, each object structure 130, 140, and 150 may include a status value 138 for the visibility flag 110. When, for example, the application program submits a given object for rendering, upon return (from the API) the application program may check the status of the visibility flag 138 within the objects data structure. If the visibility flag is clear, it informs the application program that no portion of the object was visible. If, however, the visibility flag is set, the application program then recognizes that at least a portion of the object was visible. Thus, an application program could utilize an object data structure of this format by rendering one set of the object's primitives, then checking the visibility flag 138. If the flag was set, then the application program could control the rendering of the object to render the remaining sets of object primitives. Otherwise, the application program could avoid any attempts at rendering the object.

In this regard, each set of primitives stored for a given object data structure may be rendered to a display in what is referred to herein as a single pass of the object to the graphics hardware. A first pass would render a first set of primitives, while subsequent passes would render different attributes for the same primitives. Thus, the inventive concepts could be utilized to avoid attempting to render subsequent passes when it is determined in a first pass that an object is not visible to a user. In the preferred embodiment of the present invention, it is contemplated that the first pass will typically render filled primitives, while a subsequent pass may render primitive edges.

As will be appreciated by those skilled in the art, differing data structures or software organization techniques may be employed by the application program to control the delivery of the graphics data to the rendering pipeline, consistent with the inventive concepts.

Having illustrated one potential data structure for use in a system embodying the concepts of the present invention, reference will now be made to several top level flow charts, which illustrate the functional flow of several potential embodiments.

Figure 5:
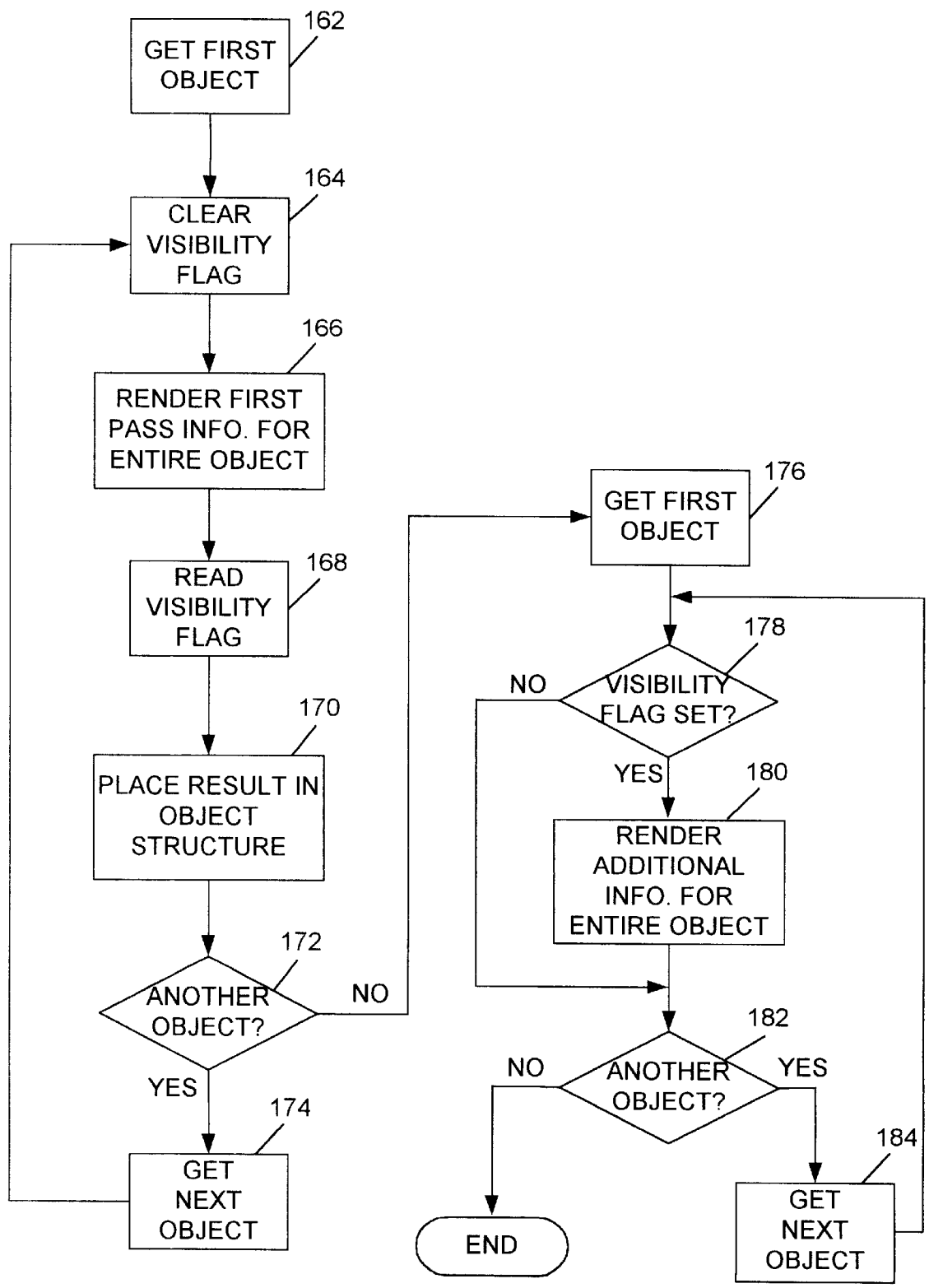
FIG. 5 is a flowchart illustrating the operation of a graphics system constructed in accordance with one embodiment of the invention.

Reference is made to FIG. 5 which illustrates a flow chart of an application program that is designed to render a graphics scene (i.e., an entire image). Such a program may (or may not) utilize a data structure of the format presented in FIG. 4. At a first step, the application program gets or obtains a first object for rendering to the display (step 162). The application program then issues a call or other command to reset a hardware visibility flag 110 (step 164). As described above, consistent with the invention, the flag may be automatically set and cleared. The application program then renders a first pass of an entire object (step 166). In the preferred embodiment, this first pass is a rendering of all primitives within an entire object structure, wherein the primitives are rendered filled. After rendering the entire object, the application program 102 reads the hardware visibility flag (step 168). It then may place the result in status value location 138 in the object structure shown in FIG. 4 (step 170). The application program 102 then determines (at step 172) whether there is another object in the graphics scene to be displayed. It may perform this evaluation by evaluating the pointer 131, 141, 151 of the object data structure. If the pointer is a value, then the application program determines that, indeed, another object must be displayed and it proceeds to the destination indicated by the pointer to retrieve the next object (step 174) and repeat the process described above. If, however, the pointer is a null value or otherwise indicates that no additional objects comprise the graphics scene, then the application program may proceed to render additional information for the objects, which may be rendered in subsequent passes through the objects' data structure. In this regard, the application program again retrieves the first object (determined by the application program) to be displayed in the graphics scene (step 176). The system then evaluates the visibility flag 138 contained within the object's structure to determine whether that object is visible or not visible to a user (step 178). If the visibility flag is set, indicating that the object or at least a portion thereof is visible to the user, then the application program will send rendering information for subsequent passes of information within the object structure. In accordance with a preferred embodiment, one such subsequent pass will include edging information (step 180). However, texture, shading, or other information may be rendered in subsequent passes as well. Thereafter, the application program determines whether another object is to be displayed (step 182), and, if so, retrieves the next object (step 184) and repeats steps 178, 180, and 182, until all visible objects are rendered.

Figure 6:
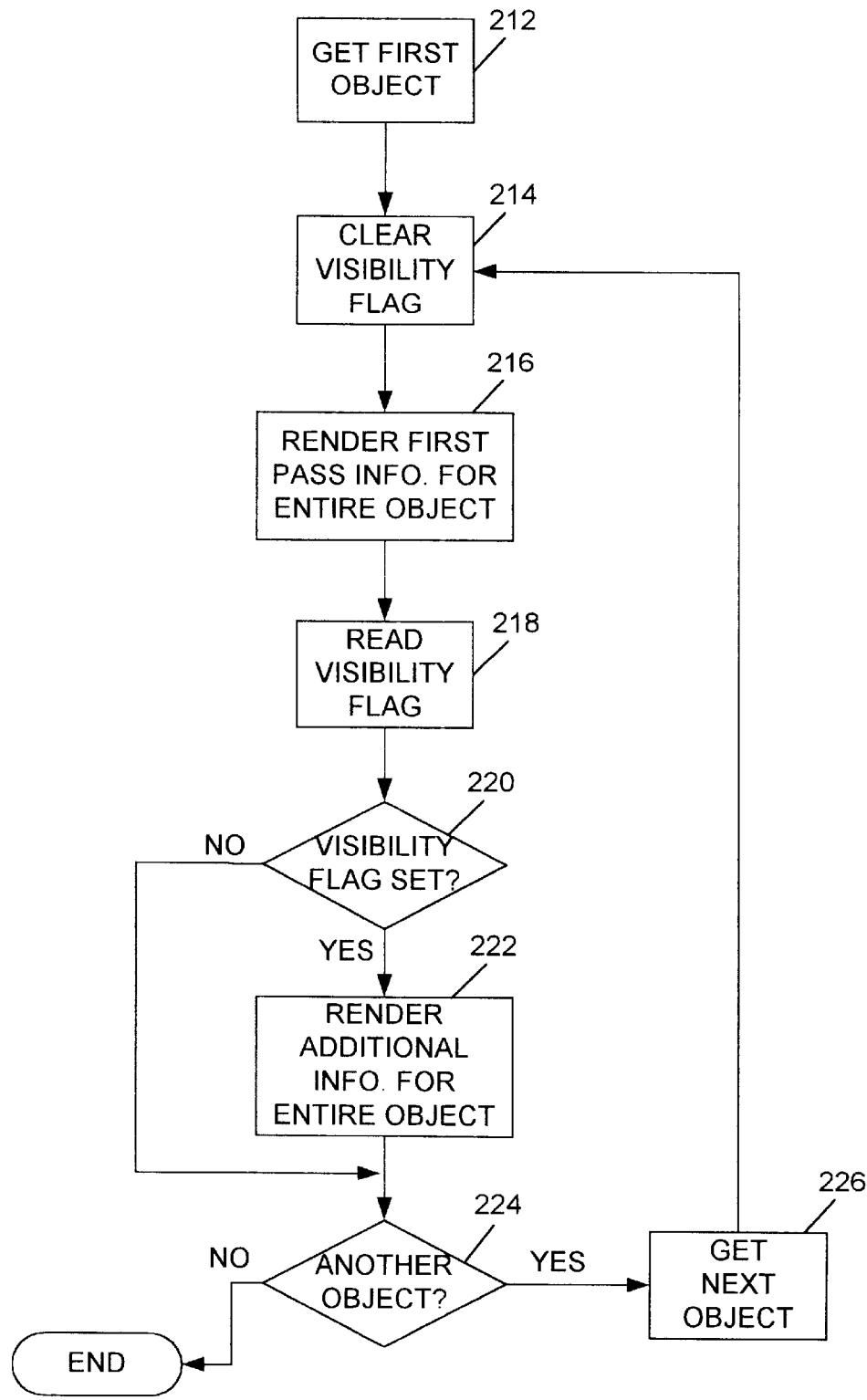
FIG. 6 is a flowchart illustrating the operation of a graphics system constructed in accordance with another embodiment of the invention.

Having described how an embodiment of the present invention may render a whole graphics scene, reference is now made to FIG. 6, which illustrates a top level functional operation describing how an embodiment may render a graphics scene one object at a time. The application program 102 begins by retrieving a first object for display (step 212). It then resets the hardware visibility flag 110 (step 214). The application program then renders a first pass of information for all primitives defining the object (step 216). The application program 102 then reads the hardware visibility flag (step 218) to determine whether a portion of the object was visible (step 220). If so, the application program 102 may then render all remaining passes of information for the primitives that define that object (step 222). The application program may then determine whether there are any additional objects to be rendered (step 224), and, if so, retrieves the next object (step 226) and repeats the foregoing sequence of steps.

As will be appreciated from the foregoing discussion, the difference between the operation of an application program as set forth in FIGS. 5 and 6 is that, in accordance with the operation of FIG. 5, an application program renders a first pass of information for each object of a graphic display before returning to render all the remaining information for each object. In FIG. 6, however, the application program completely renders each object before proceeding to the next object in this scene. However, in both cases, once a first pass of information has been rendered for a given object, further information is rendered for that object only if a portion of the object was visible, as indicated by the visibility flag that is controlled in accordance with the invention.

Figure 7:
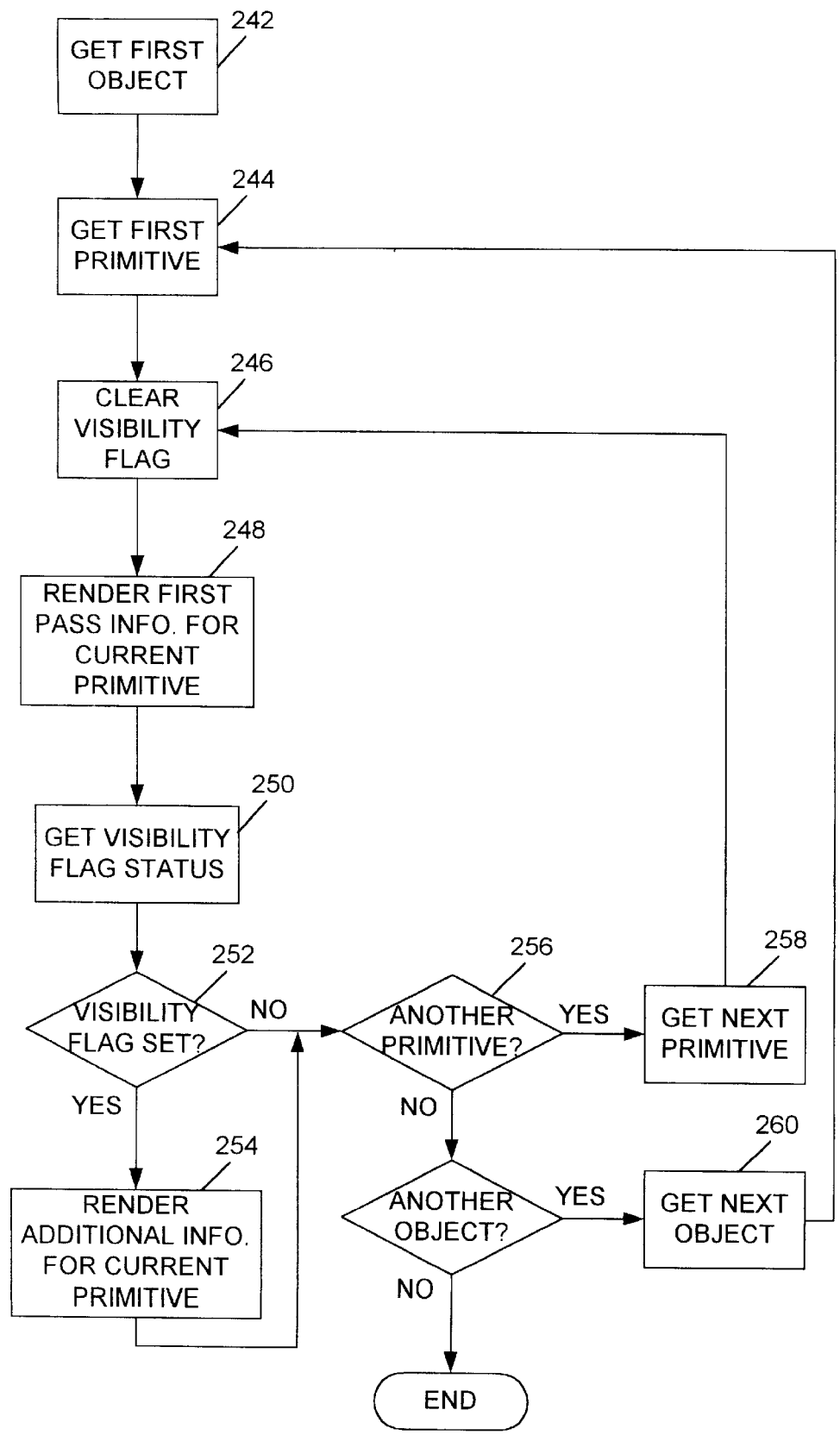
FIG. 7 is a flowchart illustrating the operation of a graphics system constructed in accordance with yet another embodiment of the invention.

Reference is now made to FIG. 7, which is a flow chart illustrating the top level of operation of an application program that is structured to render a graphics scene one primitive at a time. The application begins by retrieving a first object to be displayed (step 242). The application program then retrieves a first primitive defining that object (step 244). If the application program 102 is utilizing an object structure similar to that of FIG. 4, it may readily evaluate that object's structure to retrieve the first primitive specified therein. Thereafter, the application program resets the hardware visibility flag 110 (step 246). It then renders a first pass of information for this primitive (step 248). In this regard, and as previously discussed, this first pass of information may comprise primitive filled information. The application program 102 may then retrieve the hardware visibility flag 110 (step 250). The application program then determines whether the visibility flag was set (step 252). If, in fact, the visibility flag was set, then the application program proceeds to render any further information it has for that primitive (step 254). Such subsequent information may include edging information, texture information, or other information as will be known by persons skilled in the art. Thereafter, the application program evaluates the object's structure to determine whether additional primitives are associated with the object (step 256). If so, the application program retrieves the next primitive (step 258) and returns to step 246 to continue processing as discussed above. If, however, no further primitives are to be rendered for the given object, then the application program determines whether any additional objects are to be displayed and if so, it retrieves the next object (step 260) and returns to step 244.

It will be appreciated that the foregoing discussion of the preferred embodiments has been made to illustrate the broader concepts of the present invention, and that various modifications may be made consistent with the concepts and teachings of the invention claimed herein. For example, the foregoing discussion has described the segmentation of a graphics scene into distinct objects for rendering. However, a developer or programmer may choose to segment a graphics scene in any of a variety of ways, consistent with the invention. Thus, rather than subdivide the graphics image into distinct objects, the developer may more generically partition or segment the image into distinct segments, which do not necessarily correlate to objects. Nevertheless, the segmented graphics scene may be processed in a manner similar to that described above in connection with objects.

Furthermore, it will be appreciated that some additional delay or latency is inserted into the operation of the application program as described herein. In this regard, additional time is required for the application program to perform a check of the visibility flag and, when further information is to be rendered, initiate the rendering of that further information. However, it has been found in various trial and sample applications that overall efficiency is significantly increased by operation of the present invention, therefore making the additional latency a worthwhile tradeoff The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a computer graphics system having an application program that interfaces through an application program interface (API) to a graphics pipeline including a rendering pipeline and a frame buffer, a method of accelerating the performance of a multi-pass rendering operation comprising the steps of:

provided a visibility flag that is in communication with the application program to relay rendering information to the application program;

clearing the visibility flag upon sending new data to the rendering pipeline;

setting the visibility flag if data sent to the rendering pipeline from the application program is further communicated to the frame buffer for display;

evaluating the visibility flag from within the application program after a first pass of a first segment of graphics data has been rendered by the rendering pipeline;

inhibiting the rendering of subsequent passes of the first segment of graphics data, if the visibility flag was not set during the first pass; and rendering subsequent passes of the first segment of graphics data, if the visibility flag was set during the first pass.

2. The method as defined in claim 1, wherein the first pass performs a fill of the first segment of data.

3. The method as defined in claim 2, wherein the subsequent passes include one or more from the group consisting of: rendering edges for primitives within the graphics data, rendering texture to the surface of the primitives within the graphics data, and rendering more complete graphic data for primitives within the graphics data.

4. The method as defined in claim 1, wherein the application program controls the first pass to render a simplified form of the first segment of graphics data, and subsequent passes include rendering complete graphics data.

5. The method as defined in claim 4, wherein the application program is configured to segment graphics data into multiple segments and attempt, in a first pass, to render a simplified version of the individual segments.

6. The method as defined in claim 5, wherein the application program evaluates the visibility flag after rendering each simplified version of the individual segments in the first pass, and renders the remainder of the multiple segments only if the visibility flag is set.

7. The method as defined in claim 1, wherein the first segment is a single graphic primitive.

8. The method as defined in claim 1, wherein the first segment is an object defined by a plurality of graphic primitives.

9. A system for accelerating the rendering of computer graphics comprising:

an application program defining at least one graphic segment to be displayed;

a graphics rendering pipeline in communication with the application program, the graphics rendering pipeline configured to receive segments of graphics data from the application program;

a visibility flag configured to indicate whether any of the graphics data within a segment of graphics data sent from the application program to the rendering pipeline will be visible on a display; and a circuit configured to clear the visibility flag when a segment of graphics data is sent from the application program to the rendering pipeline, the circuit being further configured to set the visibility flag if any of the graphics data in the segment will be visible on a display.

10. The system as defined in claim 9, further including an application program interface (API) configured to interface with the application program.

11. The system as defined in claim 9, further including a frame buffer disposed to receive graphics data from the rendering pipeline for display.

12. The system as defined in claim 9, wherein the circuit is further configured to set the visibility flag if data is sent from the rendering pipeline to a frame buffer for display.

13. The system as defined in claim 9, wherein the graphic segment comprises a plurality of primitives and the application program is configured to send one primitive at a time to the rendering pipeline, the application program being further configured to check the status of the visibility flag between each successive primitive.

14. The system as defined in claim 9, wherein the graphic segment comprises a plurality of objects, wherein an object comprises at least one primitive, and the application program is configured to send one object at a time to the application program, the application program being further configured to check the status of the visibility flag between each successive object.

15. The system as defined in claim 9, wherein the application program is configured to render the graphic segment in multiple passes.

16. The system as defined in claim 15, wherein a first pass comprises a simplified rendering of the graphic segment, and subsequent passes include at least one operation from the group comprising: a complete rendering of the graphic segment, rendering filled primitive components of the graphic segment, rendering edges for primitive components of the graphic segment, and rendering texture data for primitive components of the graphic segment.

17. A method for rendering an object of a graphic segment, wherein the object comprises at least one graphic primitive, comprising the steps of (a) clearing a visibility flag;

(b) sending data defining a graphic primitive from an application program through an application program interface (API) to a rendering pipeline;

(c) determining within the rendering pipeline if any of the primitive is to be displayed on a graphic display;

(d) setting the visibility flag, if step c determines that any of the primitive is to be displayed;

(e) displaying the primitive;

(f) communicating the state of the visibility flag to the application program; and (g) repeating steps a through f for additional primitives of the object.

18. The method as defined in claim 17, wherein steps a and b may be performed in opposite order.

19. The method as defined in claim 17, wherein steps d, e, and f may be performed in differing relative orders.

* * * * *